July 28, 1953 G. P. STOUT ET AL 2,646,715
APPARATUS FOR VISUAL INSPECTION OF BOTTLED GOODS
Filed July 19, 1949 3 Sheets-Sheet 3
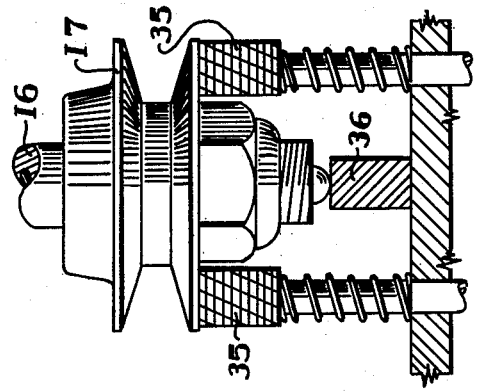
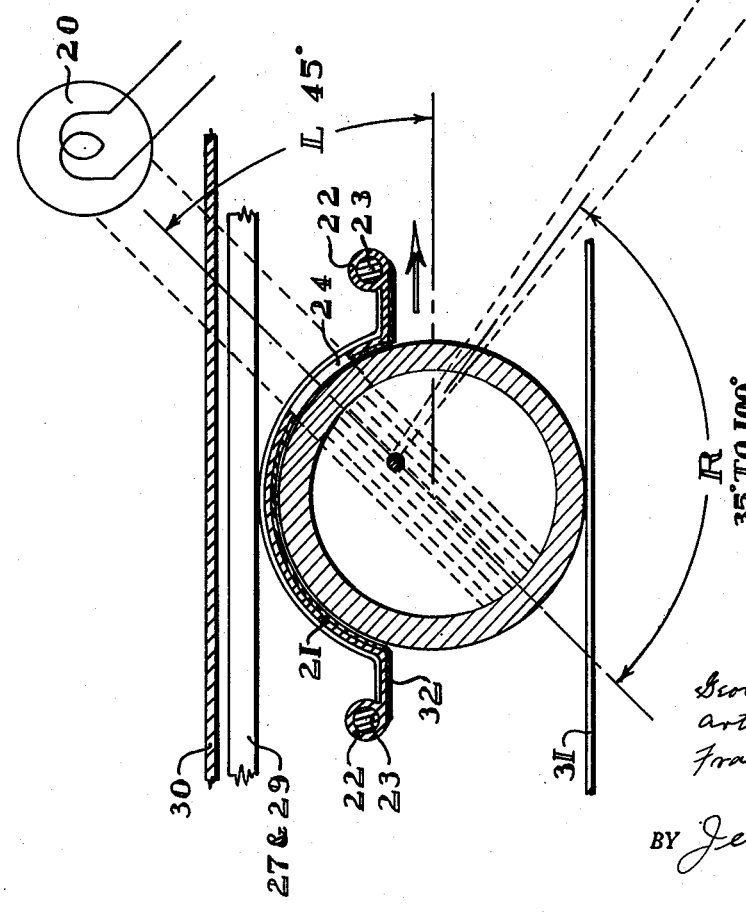

Patented July 28, 1953

2,646,715

UNITED STATES PATENT OFFICE 2,646,715

APPARATUS FOR VISUAL INSPECTION OF BOTTLED GOODS

George Philip Stout, Baltimore, Arthur C. Powell, Ruxton, and Francis J. Taylor, Jr., Hanover, Md.

Application July 19, 1949, Serial No. 105,614

5 Claims. (Cl. 88—14)

The invention relates to the visual inspection of bottled goods, particularly beverages in transparent containers such as bottles, and has as an object the provision of a relatively simple form of apparatus whereby bottles of liquids may be visually inspected without subjecting the inspector to tiring eye strain.

In a former patent issued to George P. Stout on October 11, 1938, No. 2,132,447, and assigned to Coca-Cola, Inc., there is disclosed and claimed an apparatus and method for automatic inspection of liquid packages. The principle of this method utilizes the sudden change of illumination of a photoelectric cell.

The apparatus of the present application constitutes an improvement over the apparatus disclosed in this patent as it can be manufactured relatively inexpensively, placing it within the resources of some of the smaller bottling plants.

At present, such plants which do not find the referred to expense justifiable or within their means are depending upon a common method of visual inspection according to which the bottles are illuminated individually or in groups, and are looked at individually by the inspector; which is very trying work, requiring a great degree of concentration. The required concentration is so onerous that it may safely be continued for only relatively short periods. Should the period of duty be unduly prolonged to the point of severe fatigue, the results of the inspection cannot be depended upon.

It is therefore an object of the present invention to provide a machine which can be built at moderate cost and to this end supplants automatic mechanism by visual inspection, in such a manner as to remove necessity of tiring concentration on the part of the inspector.

It is a further object of the invention to provide a process of inspecting liquids packaged in containers, as to presence of or freedom from foreign bodies, which process may be carried out by the apparatus of the present invention or by many other forms of apparatus or by no apparatus other than a source of illumination and the hands of an inspector.

The process of the invention depends upon the application of three principles which, in the order of their importance are: 1st, the attention-attracting capacity of a moving object; 2nd, the "Tyndall effect"; and 3rd, the effect upon light reflection of its polarization.

The 1st principle is well recognized by hunted and hunting birds and animals including man. When an object inanimate or animate is motionless, it is to all purposes invisible since the attention of an observer will not be attracted to it. Any appreciable movement of the object will, however, cause it to be seen. In the case of the normal human vision with the gaze directed forwardly, movement will be perceived at any point laterally through an angle of nearly 180°.

This principle is made use of in the process of the present invention by causing the liquid in containers to move in the field of vision of an inspector, any foreign body contained in the liquid moving with it (preferably relatively to the wall of the container), and therefore attracting the attention of an inspector. The gaze of the inspector need not be concentrated upon the material under inspection. The attention of the inspector will be attracted by movement of any foreign body in the liquid, under the conditions provided by the invention, even though the mind of the inspector is not closely applied to inspection alone, so long as he is not deeply absorbed in other matters; and even though the foreign body approaches the microscopic.

The 2nd principle, the "Tyndall effect" is a common phenomenon most often observed when a beam of sunlight enters an otherwise darkened room and causes particles of dust to be clearly visible. Particles not usually visible are clearly seen when so illuminated.

The 3rd principle is utilized to prevent glare spots caused by reflection of light from a wall confining the liquid under inspection. Rays of light reflected from a surface at a low angle are polarized and produce glare. If the light striking the surface is polarized so as to vibrate in a plane cutting the reflecting surface or the surface is viewed through a polarizing substance, the glare is reduced or entirely eliminated if the plane of polarity is properly chosen.

In the practice of the method of the invention and in the apparatus of the invention it is preferred to polarize the light before it strikes the wall confining the liquid to be inspected as thereby it is not necessary for the inspector to use any special viewing apparatus; however, it is to be understood that the use of polarized spectacles is considered the full equivalent of illumination by polarized light. The use of any polarization is preferable only and not essential to the invention.

Further objects will appear when read in connection with the accompanying drawings wherein:

Figure 3 is a diagrammatic view illustrating the rays of light;

Figure 4 is a detail section in line 4—4, Figure 2, showing details of a brake structure; and Figure 5 is a detail elevation of brake structure of Figure 4.

Figure 1:
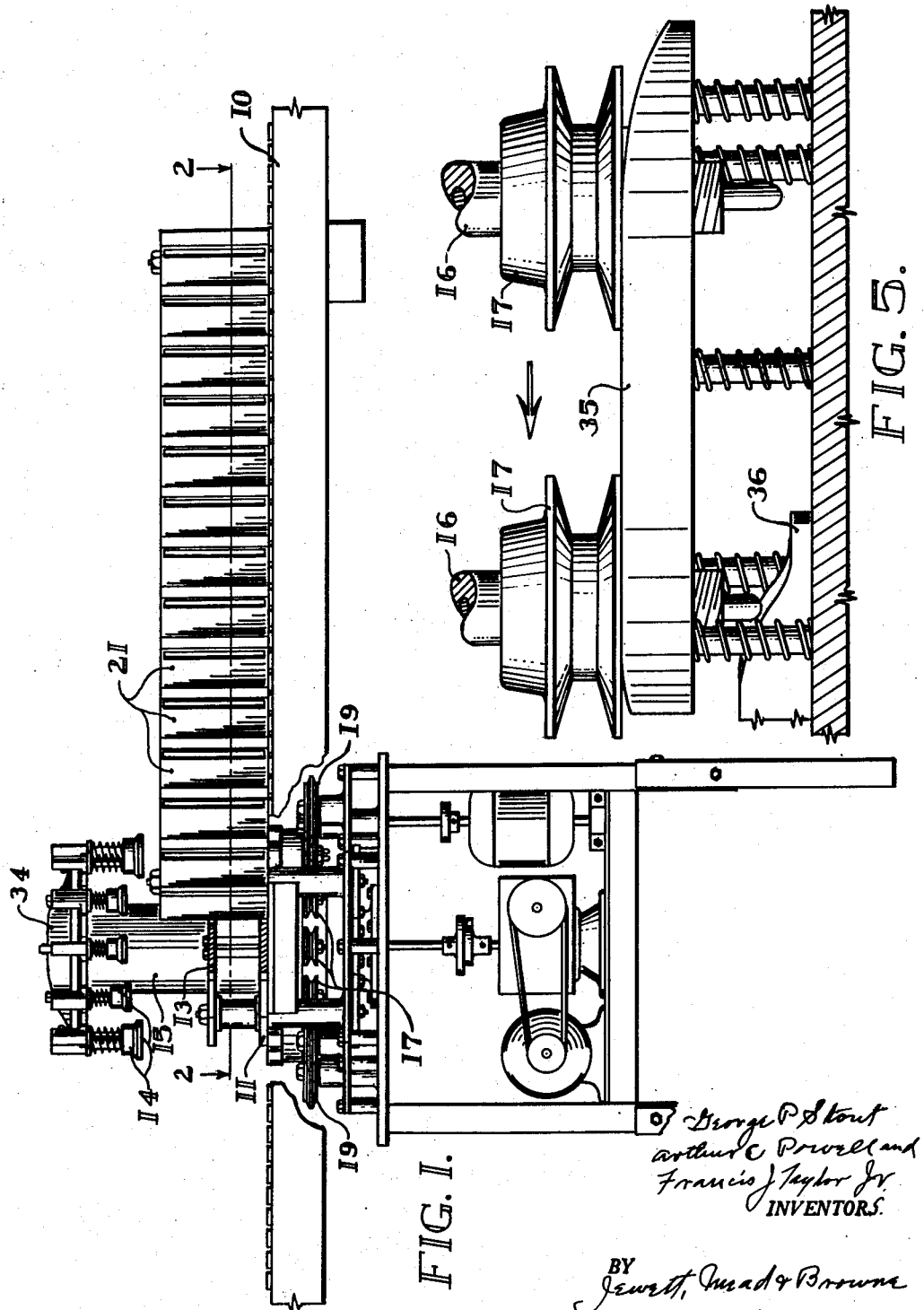
Figure 1 is a front elevation.

To achieve the objects of the invention, the receptacles containing liquid to be inspected for presence of foreign bodies are manipulated to cause the liquid to be in motion, and preferably the receptacles (usually bottles) containing the liquid are stationary relative to the contained liquid and illumination. In this condition the light is passed through the receptacles and liquid, whereupon the light will be reflected from the foregin body moving with the liquid so as to become plainly visible and will not be confused by foreign particles on the exterior of the container.

To apply the Tyndall effect in the preferred manner, according to the present invention, the receptacles (as bottles) are rapidly revolved to bring the contents into revolution, whereupon the revolution of the receptacles is stopped, leaving the contained liquid in motion of revolution. In this condition, when light is passed through the containers and liquid the presence of any foreign body, even if very minute, promptly catches the eye of an observer.

In the preferred form of apparatus for practice of the invention in the inspection of bottled liquid, the bottles are spun, a brake is utilized to stop the spinning, the bottles are delivered to a conveyor, while liquid is still in revolution, and while on the conveyor are moved past a source or sources of light, while partially shielded from the light by opaque means formed with a slit to reduce the light to a narrow beam substantially as high as the height of the liquid. A plurality of bottles are at all times in the field of view of an inspector. Preferably, for reasons given below, the light is polarized, and also preferably the observer is located so as to view the liquid from a point at a horizontal angle to the path of the light, so as to visualize only reflected light.

As shown the apparatus of the invention utilizes a usual form of endless conveyor 10 upon which filled and capped containers are progressed along the bottling apparatus. To remove containers from the conveyor 10 there is shown a star wheel 11 driven in timed relation with spinners 12 to which the bottles are moved by the star wheel in coaction with a guide fence 13.

To center and control the tops of the containers while spinning, there are shown revolubly mounted spring pressed caps 14 carried by a central standard 15 which revolves with the table carrying the spinners 12. The caps are lifted to receive and release the containers and lowered thereon by stationary 34 cam. Each spinner 12 is mounted on a shaft 16 carrying a sheave 17, the sheaves each driven by a belt 18 passing about pulleys 19. The structure of the turn table 15 carrying the spinners 12, the caps 14, and the spinning belt 18 is well understood in the art, being similar to that shown in the former patent above referred to.

The spinning of the containers is for the purpose of causing movement of revolution in the contained liquid. To cause relative movement between the liquid and its enclosure, there is shown brake means 35 shown as spring pressed against the lower surfaces of the sheaves 17.

To illuminate the liquid for inspection purpose there is shown a plurality of lamps 20. While separate lamps are shown it may be preferred to utilize a bank of fluorescent lamps to form—in effect—a sheet of uniform illumination along the inspection area.

To restrict the light illuminating the liquid to a narrow beam there is shown a shield 21 (Figure 3) for each container, the respective shields being arcuate in plan, in height substantially the same as the containers, and the respective shields pivoted to the ones adjacent thereof by hinge loops 22 and pintle pins 23. Each shield is shown as provided with a light passing slit 24.

The series of shields is shown as joined into an endless chain of shields passing about and driven by star wheels 25, 26 driven synchronously with star wheels 11 and 12 by means not shown.

To guide the chain of shields there is shown an upper guide rail 27 supported on a post 28 and a lower rail 29 lapping over the conveyor 10. A plate 30 of light polarizing material is shown for reasons given below.

To confine the containers in the shields 21 there is shown a wire 31 desirably passing along the row of containers at a position above their bottoms. To cushion the shields against impact with the containers and provide a durable black background, a coating 32 (Figure 3) of rubber like material is indicated.

The invention is applicable to light transmitting liquids of various kinds and in various kinds of transparent containers. As illustrated the apparatus is particularly designed for bottled liquids as drinks.

In operation the bottles are spun while passing about the turntable and the spinning is suddenly checked at or just before the time when the bottles are returned to the conveyor 10. An observer located at an inspector's position indicated at 33 will merely gaze in the general direction of the passing bottles, whereupon any particle of appreciable size moving with the liquid will attract attention by its reflected light.

Figure 2:
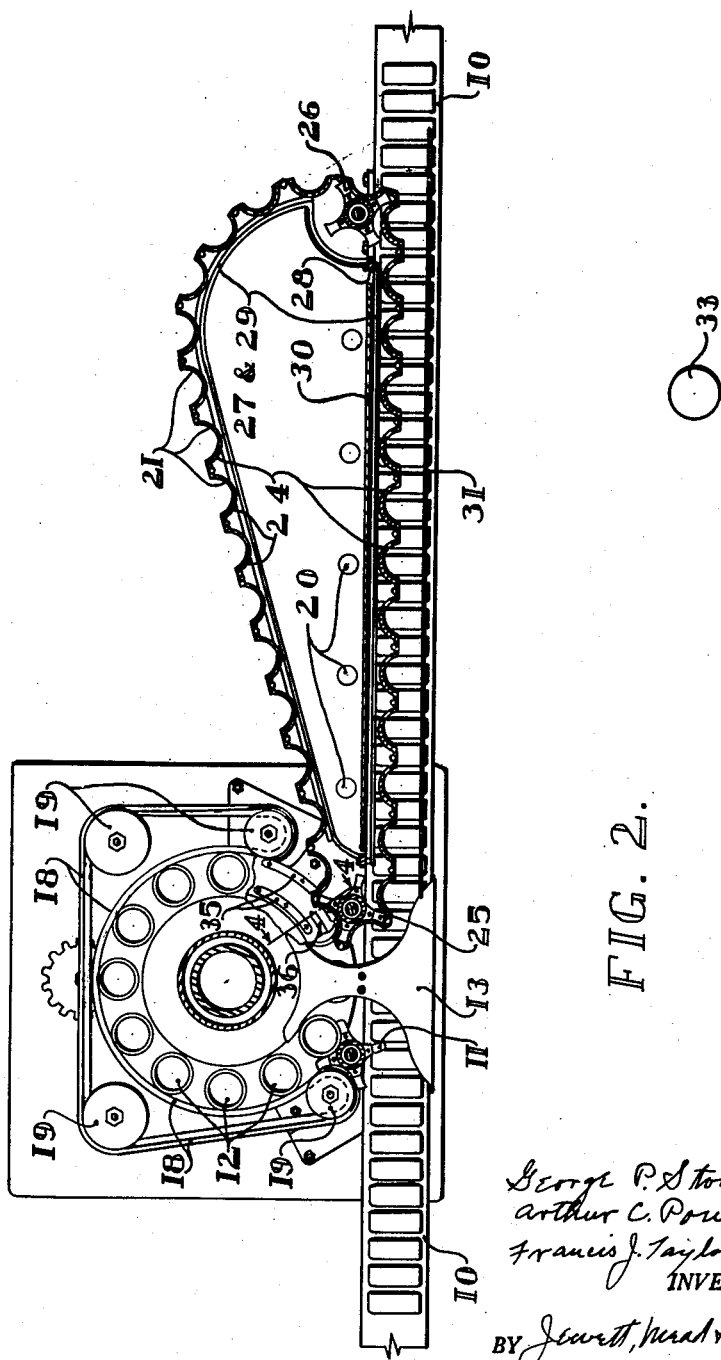
Figure 2 is a horizontal section on line 2—2 of figure 1.

The reflection upon which the inspection depends will only be seen by an observer located at an angle of less than 180° from the light beam. While the angle is not critical it is found that best results are had if the angle R, Figure 3, is approximately 65°. Inspection of Figure 2 will show that the angle R will be at a maximum as the bottles first come under inspection and will diminish as they travel. It is preferred to so locate the inspector's station that the angle R will initially be about 100° and finally about 35° to cause the average angle to be nearly 65°. When so arranged a particle will increase in visibility to a maximum at the optimum angle and then decrease.

When a foreign body is seen in any container the latter is manually removed by the inspector.

When the light used for test vibrates in all planes there is seen a glare point where the light enters the container and a lesser one at the exit, due to reflection by the walls of the container. Use of polarized light avoids these distractions, i. e., removes reflected glare or highlights from the wall of the bottle.

The cushion layer 32 provides a black background for any illuminated particle of foreign matter present. With a clear liquid illuminated by a slit and with a black background the liquid is invisible and a particle of foreign matter invisible directly will be immediately prominent by light reflected from it.

Minor changes in the steps of the process of the invention and in the apparatus shown for carrying out the steps of the process, within the scope of the following claims, may be made without departing from the spirit of the invention.

We claim:

1. Apparatus for use in inspecting liquid packaged in light permeable containers comprising, in combination: means to cause motion of revolution of the liquid relatively to the container; means to move the containers past an inspecting station; shield members for the respective containers; means to move the shield members with the containers past said station; said shield members each formed upon an arc of a cylindrical surface, and partially surrounding the respective containers while moving therewith, each said shield member formed with a slit; and a source of light behind said slits to illuminate with a narrow beam the moving liquid in the containers as they pass said station.

2. The structure of claim 1 in which a plurality of the shield members are flexibly connected into an endless chain of members; with means to transfer each member from a position of shielding an inspected container to a position to shield a container to be inspected.

3. The structure of claim 1 wherein the shield members have a surface which is non-reflective of light directed toward the container.

4. The structure of claim 3 in which the non-reflective surface is provided by a coating of resilient material applied to the member and presenting a cushion to impact of the containers.

5. The structure of claim 1 wherein the locations of the slits in the shield members and the inspecting station are so related that inspection at an angle of less than 180° to the beam of light passing the slit will result.

GEORGE PHILIP STOUT.
ARTHUR C. POWELL.
FRANCIS J. TAYLOR, Jr.

References Cited in the file of this patent

UNITED STATES PATENTS

| Number | Name | Date |
|---|---|---|
| 1,006,455 | Barnes | Oct. 24, 1911 |
| 1,204,664 | Jackson | Nov. 14, 1916 |
| 1,648,369 | Svedberg et al. | Nov. 8, 1927 |
| 1,775,916 | Richter | Sept. 16, 1930 |
| 2,132,447 | Stout | Oct. 11, 1938 |
| 2,174,848 | Stahmer | Oct. 3, 1939 |
| 2,268,098 | Weathers | Dec. 30, 1941 |
| 2,368,350 | Ellison | Jan. 30, 1945 |
| 2,436,082 | Stout | Feb. 17, 1948 |
| 2,446,377 | Marshall | Aug. 3, 1948 |

FOREIGN PATENTS

| Number | Country | Date |
|---|---|---|
| 381,335 | Great Britain | Oct. 6, 1932 |

OTHER REFERENCES

Wood, R. W., Text, "Physical Optics," 3rd ed., 1936, pages 423, 424; publ. Macmillan Co., New York, New York.